US012687077B2

(12) United States Patent
Lindfors

(10) Patent No.: US 12,687,077 B2
(45) Date of Patent: Jul. 21, 2026

(54) SAMPLING PIPE OF A SAMPLING ARRANGEMENT

(71) Applicant: ERIMEK OY, Vantaa (FI)

(72) Inventor: Erik Lindfors, Vantaa (FI)

(73) Assignee: ERIMEK OY, Vantaa (FI)

( * ) Notice: Subject to any disclaimer, the term of this patent is extended or adjusted under 35 U.S.C. 154(b) by 0 days.

(21) Appl. No.: 19/115,319

(22) PCT Filed: Sep. 13, 2023

(86) PCT No.: PCT/FI2023/050519
§ 371 (c)(1),
(2) Date: Mar. 26, 2025

(87) PCT Pub. No.: WO2024/074756
PCT Pub. Date: Apr. 11, 2024

(65) Prior Publication Data
US 2026/0098449 A1    Apr. 9, 2026

(30) Foreign Application Priority Data

Oct. 4, 2022    (FI) ...................................... 20225894

(51) Int. Cl.
*E21B 21/015*    (2006.01)
*E21B 49/02*    (2006.01)
*G01N 1/02*    (2006.01)

(52) U.S. Cl.
CPC ............ *E21B 21/015* (2013.01); *E21B 49/02* (2013.01); *G01N 1/02* (2013.01)

(58) Field of Classification Search
CPC ...... E21B 21/015; E21B 21/011; E21B 21/07; E21B 21/065; E21B 21/066; E21B 21/067

USPC ........................................... 175/209; 392/304
See application file for complete search history.

(56) References Cited

U.S. PATENT DOCUMENTS

| | | | | |
|---|---|---|---|---|
| 2,327,482 | A | * | 8/1943 | Aitchison ................. E21B 7/14 266/49 |
| 2,771,271 | A | * | 11/1956 | Lawson, Sr. ....... B23Q 11/0046 15/409 |
| 3,638,737 | A | * | 2/1972 | Moates ................. E21B 21/015 173/60 |
| 3,965,997 | A | * | 6/1976 | Hilding ................... E21B 19/24 173/52 |

(Continued)

FOREIGN PATENT DOCUMENTS

| | | |
|---|---|---|
| CN | 107687961 A | 2/2018 |
| CN | 113990600 A | 1/2022 |

(Continued)

*Primary Examiner* — Kenneth L Thompson
(74) *Attorney, Agent, or Firm* — S.J. INTELLECTUAL PROPERTY LTD.

(57)    ABSTRACT

A sampling pipe (7) of a sampling arrangement (6) for taking a sample from drilling dust flowing in a dust removal pipe (5) of a drilling apparatus, at an end of which sampling pipe (7) there is a suction opening (8) which is arranged to be positioned in the dust removal pipe (5) of the drilling apparatus to suck drilling dust into the sampling pipe (7). The sampling pipe (7) comprises a suction pipe (10) into which the drilling dust of the dust removal pipe (5) is arranged to be conveyed via the suction opening (8) of the sampling pipe (7), and a coil (11) connectable to alternating current and wound around the suction pipe (10).

15 Claims, 2 Drawing Sheets

(56)             References Cited

U.S. PATENT DOCUMENTS

Figure 1:
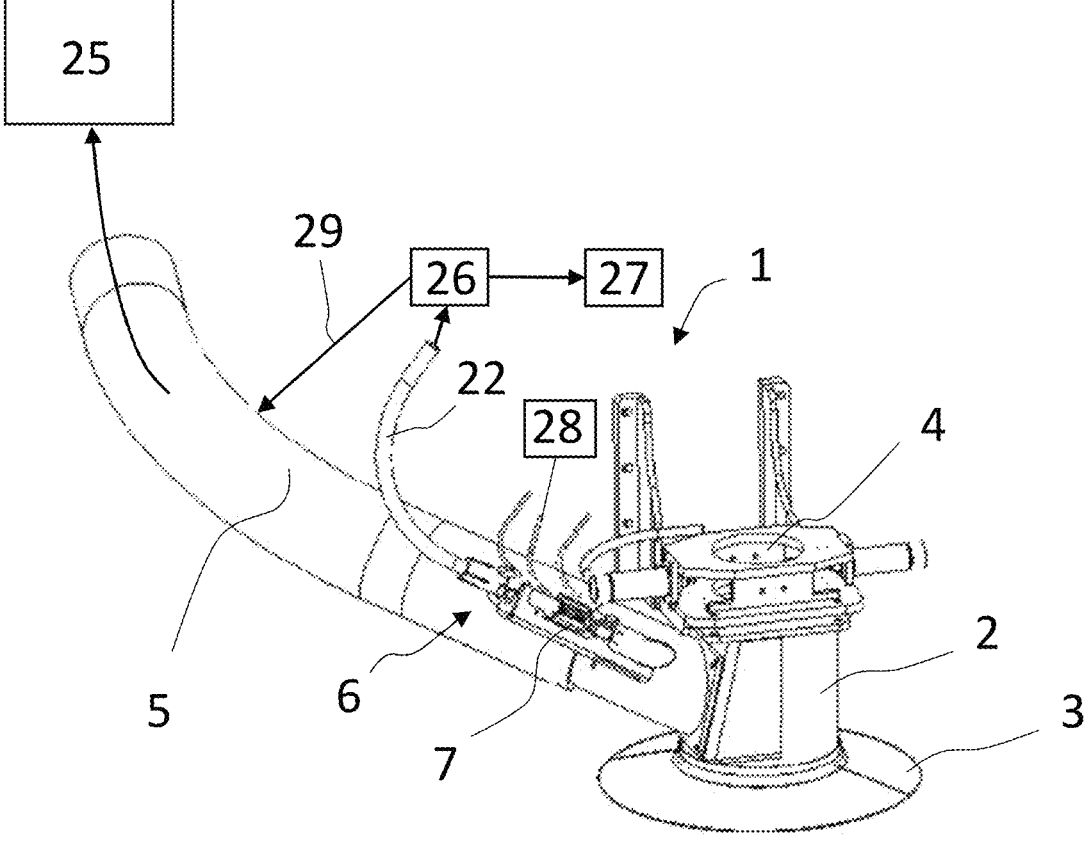

| | | | |
|---|---|---|---|
| 4,387,514 A * | 6/1983 | McCaskill, Jr. ...... | F26B 3/0923 |
| | | | 34/182 |
| 6,763,605 B2 * | 7/2004 | Reddoch ................... | B04B 3/00 |
| | | | 175/207 |
| 9,004,817 B2 * | 4/2015 | Hanasaka ................. | B09C 1/06 |
| | | | 405/128.85 |
| 2017/0254164 A1 * | 9/2017 | Folk ........................ | F26B 3/347 |
| 2019/0226289 A1 | 7/2019 | Ramjit et al. | |
| 2019/0226338 A1 | 7/2019 | Erik et al. | |

FOREIGN PATENT DOCUMENTS

| | | | |
|---|---|---|---|
| CN | 114923725 A | 8/2022 |
| GB | 792632 A | 4/1958 |
| JP | 2017061822 A | 3/2017 |
| WO | 2017220858 A1 | 12/2017 |

* cited by examiner

SAMPLING PIPE OF A SAMPLING ARRANGEMENT

An object of the invention is a sampling pipe of a sampling arrangement for collecting geological research samples from a dust removal pipe of a drilling apparatus, for example a mine drill. An object of the invention is also a dust removal arrangement of a drilling apparatus.

Extraction of ore or other minerals is carried out at mines typically by drilling and charging a large number of deep shot holes in an arrangement that is technically advantageous for blasting. In the drilling of deep boreholes, compressed air, a compressed air-water mixture or water that is blown via a boring pipe is used to carry the rock material removed by the bit out of the borehole. The rock material is blown by way of the medium typically into a small heap around the borehole. In smaller wagon-type drilling machines the borehole is closed with a rubber collar and the rock material blown out of the hole is sucked via a dust removal pipe into a dust separator. The wanted ore is not always evenly distributed in the bedrock of the mine area, but in the ore deposit there may be waste rock or 'gangue' with a lower or non-existent ore content. The mining of gangue cannot be avoided, but the progression of gangue to crushing and beneficiation stages is advantageously to be minimised. In terms of the beneficiation process, it is advantageous to know in advance the quality of the crushed ore material entering the process as accurately as possible and to avoid its processing by separating it in the mining.

Quality of the ore in the orebody to be extracted is first determined by test drilling and in the production drilling stage by collecting rock samples with a shovel into sample bags from the heaps of rock material formed around the boreholes during drilling. Sample collection is often manual work and requires the worker to move around the drilling site. Drilling site conditions are typically dusty and the nature of fine dust released from heaps can be harmful to the health of the worker collecting the samples. The collected samples are split several times to provide a sample from which the concentrations of wanted minerals are determined. The weakness of heap samples is that the depth information of the gangue or ore deposit from the drilling level can no longer be obtained from the rock material taken from the heap. A sample taken from the heap represents a kind of, often non-representative hole average. It is also known that some of the wanted mineral has possibly escaped with the finer material carried by the wind and gangue is over-expressed in the heap as opposed to the wanted mineral.

WO 2017/220858 A1 describes a sampling arrangement for taking a sample of drilling dust from a dust removal pipe of a drilling apparatus. The sampling arrangement comprises a sampling pipe having a mouth opening mounted onto the dust removal pipe of the drilling apparatus to suck drilling dust into the sampling arrangement.

One known problem occurs particularly in the drilling of ores containing magnetite. The rock material released from magnetite ores during drilling is magnetic and in part also statically charged fine material. These properties make the material adhesive, especially to parts and surfaces of a sampling device containing iron or other ferro-magnetic material. Magnetite dust particles also have a strong tendency to adhere to each other. As a consequence, the material is highly vault-forming in cyclones and easily clogs the dust separation cyclones, especially if the cyclone walls are made of steel plate.

The purpose of this invention is to provide a sampling pipe of a sampling arrangement and a dust removal arrangement of a drilling apparatus by which the afore-mentioned disadvantages may be reduced.

The objective according to the invention may be achieved by a sampling pipe of a sampling apparatus according to claim 1, at an end of which there is a suction opening which is mountable to a dust removal pipe of a drilling apparatus to suck drilling dust into the sampling pipe. The sampling pipe comprises a suction pipe into which the drilling dust of the dust removal pipe is arranged to be conveyed via the suction opening of the sampling pipe, and a coil connectable to alternating current and wound around the suction pipe.

A dust removal arrangement of a drilling apparatus according to the invention comprises a dust removal housing to be fitted around a mouth opening of a borehole, a dust removal pipe connected to the dust removal housing, a suction apparatus for forming suction in the dust removal housing and the dust removal pipe, and a sampling arrangement for taking a sample from drilling dust flowing in the dust removal pipe. The sampling arrangement further comprises a sampling pipe according to the invention, a suction opening of which is located in the dust removal pipe or dust removal housing, for example towards the flow direction of the drilling dust.

Considerable advantages may be achieved by means of the invention.

The sampling pipe comprises an alternating-current coil to which alternating current is fed to provide an alternating magnetic field that demagnetises the magnetic particles in the drilling dust sample being sucked into the sampling pipe. This way, adhesion of the particles to surfaces of the sampling device may be reduced. In addition, the coil oscillates under alternating current, and the oscillation is transmitted to the suction opening of the sampling pipe, whereby particles adhered to the suction opening are released under the oscillation. In addition, heat is generated in the coil, which dries the moist drilling dust being sucked into the sampling pipe and thus reduces adhesion of the dust to surfaces of the sampling pipe.

In one embodiment of the invention the sampling pipe comprises a flow amplifier for forming suction in the suction opening of the sampling pipe, which flow amplifier comprises an ejector nozzle for feeding compressed air into the sampling pipe/suction pipe. At an end of the sampling pipe there is an end piece on which the ejector nozzle is located. The end piece is made of elastic material arranged to stretch and thereby open the ejector nozzle when compressed air is fed to the ejector nozzle, and to shrink and thereby close the ejector nozzle when the feeding of compressed air to the ejector nozzle ceases. This provides an ejector nozzle that is simple in structure and that automatically opens and closes when the feeding of compressed air starts and stops.

Figure 2:
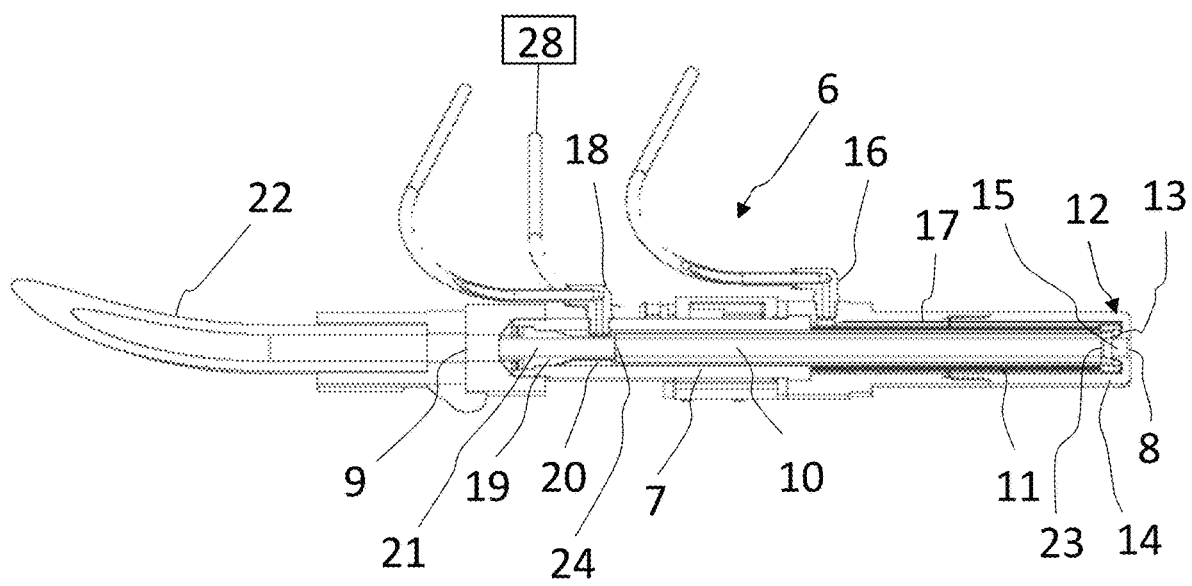
Figure 3:
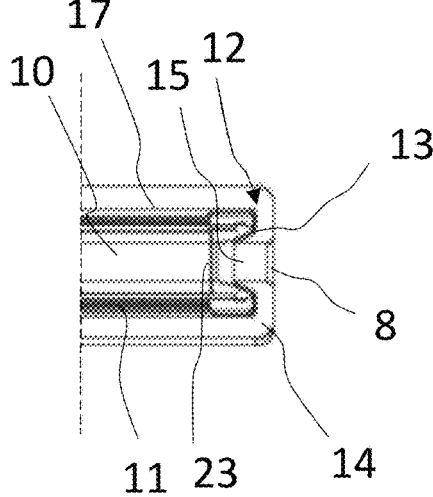

The invention will be described in detail below by means of examples of embodiments with reference to the accompanying drawings, in which FIG. 1 shows a sampling arrangement according to one embodiment of the invention and a dust removal arrangement having a dust removal pipe in which a sampling pipe according to one embodiment of the invention is arranged, FIG. 2 shows as a section drawing the sampling pipe of the dust removal arrangement of FIG. 1, and FIG. 3 is a partial enlargement of an end of the sampling pipe of FIG. 2.

FIG. 1 shows a dust removal arrangement 1 of a drilling apparatus. The drilling apparatus may be for example a mine drilling machine used in opencast mines comprising an undercarriage and a drill in which there is an extendable drill pipe and a bit at its end. The drilling apparatus may be movable in the mine area for example by a motor-driven tracked undercarriage. Holes will be drilled in the ground by the drilling apparatus, from which holes the drilled material, for example rock material, escapes to the ground surface from the borehole. A fluid, such as water, compressed air or a compressed air-water mixture, can be conveyed via the drill pipe to transport the rock material removed by the drill bit out of the borehole. The drilling apparatus comprises a dust removal arrangement 1 for re-moving dust released from the borehole.

The dust removal arrangement 1 comprises a dust removal housing 2 surrounding the drill pipe to be fitted over the borehole. The dust removal housing 2 may be provided with a collar 3 which is placed against the ground around the mouth opening of the borehole. On top of the dust removal housing 2 there is an opening 4 for the drill pipe (not shown), at an end of which there is a drill bit. The dust removal arrangement 1 comprises a dust removal pipe 5 connected to the dust removal housing 2, for example to the side of the dust removal housing 2. The dust removal pipe 5 is in flow communication with the dust removal housing 2. In addition, the dust removal arrangement 1 comprises a suction apparatus 25 for forming suction in the dust removal pipe 5 and further in the dust removal housing 2.

The dust removal arrangement 1 comprises a sampling arrangement 6 for collecting a drilling dust sample from drilling dust flowing in the dust removal pipe 5. The structure of the sampling arrangement 6 is illustrated in more detail in FIGS. 2 and 3. The sampling arrangement 6 comprises a sampling pipe 7 in which there is a suction opening 8 positioned in the dust removal pipe 5. The suction opening 8 may be located at an end of the sampling pipe 7. The suction opening 8 is positioned in the dust removal pipe 5 so that it faces towards the flow direction of the drilling dust. A distance of the suction opening 8 from the joining point of the dust removal housing 2 and the dust removal pipe 5 is preferably 10-400 mm. The suction opening 8 is positioned in the main flow of the dust removal pipe 5. The suction opening 8 is positioned in a longitudinal direction of the dust removal pipe 5 at a point where a flow of drilling dust coming from the dust removal housing 2 first impinges on the inner surface of the dust removal pipe 5 after the joining point between the dust removal housing 2 and the dust removal pipe 5. FIG. 1 shows the dust removal pipe 5 partially cut at the mouth opening 8 of the sampling pipe 7.

In addition, the sampling arrangement 6 comprises a separating device 26 for separating the solid material contained in a drilling dust sample from the airflow. The sampling pipe 7 comprises an outlet opening 9 being in flow communication with the separating device 26, for example through a connecting pipe 22. The outlet opening 9 may be located at a second end of the sampling pipe 7. The separating device 26 may be a cyclone, a filter or a combination thereof. The sampling arrangement 6 also comprises a collecting arrangement 27, such as a sample bag, into which the solid material separated by the separating device 26 is collected. In addition, the sampling arrangement 6 may comprise a return pipe 29 for conveying the air that is removed from the separating device 26 back to the dust removal pipe 5. The return pipe 29 is connected to the separating device 26, for example the cyclone. In addition, the return pipe 29 is connected to the dust removal pipe 5, for example in flow direction to a point after the suction opening 8 of the sampling pipe 7 in the dust removal pipe 5. By means of the return pipe 29, the effect of fluctuations in the negative pressure level of the dust removal pipe 5 on the operation of the sampling arrangement 6 can be compensated for. The negative pressure level in the dust removal pipe 5 may vary from one drilling apparatus to another. In addition, different drilling equipment manufacturers use different negative pressure levels in dust removal pipes.

In FIGS. 2 and 3 the structure of the sampling pipe 7 is illustrated in more detail. The sampling pipe 7 comprises a suction opening 8 to be fitted to the dust removal pipe 5 of the drilling apparatus to suck drilling dust from the dust removal pipe 5 into the sampling pipe 7. The sampling pipe 7 further comprises a suction pipe 10 into which the drilling dust sucked from the dust removal pipe 5 is arranged to be conveyed via the suction opening 8 of the sampling pipe 7. The suction pipe 10 may comprise a metal body, for example an aluminium body or a ferromagnetic body.

The sampling pipe 7 further comprises an alternating-current coil 11 wound around the suction pipe 10. The coil 11 is typically wound against the outer surface of the suction pipe 10. The coil 11 may extend from an end of the suction pipe 10 closest to the suction opening 8 towards a second end 24 of the suction pipe 10. The coil 11 is connectable to alternating current. On the inner surface of the suction pipe 10 there may be a rubber layer that protects the body of the suction pipe 11 from wear. The sampling pipe 7 comprises connectors for connecting the coil 11 to alternating current. The dimensions and other characteristics of the coil 11 are selected for each application for example by experimentation. The sampling arrangement 6 or the sampling pipe 7 may comprise an inverter 28 for converting direct current into alternating current. The electrical systems of drilling equipment typically use 24V direct current. The inverter 28 is arranged to convert the direct current of the electrical system of the drilling apparatus into alternating current which is fed to the coil 11. The inverter 28 is connected to the coil 11.

The sampling pipe 7 comprises a flow amplifier 12 for forming suction in the suction opening 8 of the sampling pipe. The flow amplifier 12 comprises an ejector nozzle 13 for feeding compressed air or other pressurized fluid into the sampling pipe 7 and/or the suction pipe 10. The ejector nozzle 13 and the compressed air flow that is fed from the ejector nozzle 13 are directed away from the suction opening 8 of the sampling pipe. The ejector nozzle 13 is located between the suction opening 8 of the sampling pipe 7 and an end 23 of the suction pipe 10. The sampling pipe 7 may comprise an end piece 14 provided with a drilling dust suction channel 15 and having the ejector nozzle 13. The end piece 14 is located at the end of the sampling pipe 7. The suction opening 8 is located in the end piece 14 at the end of the suction channel 15. The ejector nozzle 13 may be annular, whereby it surrounds the suction channel 15. The internal diameter of the suction channel 15 at the ejector nozzle 13 is equal to the internal diameter of the suction pipe 10. A narrowing in the suction pipe 10 or in the suction channel 15 of the end piece and an open ejector nozzle 13 may be harmful when the sampling pipe 7 is cleaned, for example by fluid blasting or by a cylindrical brush. The end piece 14 is positioned in front of the end 23 of the suction pipe 10, for example against the end 23 of the suction pipe 10. The end piece 14 may extend around the suction pipe 10.

The ejector nozzle 13 is arranged to open when compressed air is fed to the ejector nozzle 13, and to close when the feeding of compressed air to the ejector nozzle 13 is stopped. The end piece 14 is made for example of elastic material, for example rubber, arranged to stretch and thereby open the ejector nozzle 13 when compressed air is fed to the ejector nozzle 13, and to shrink and thereby close the ejector nozzle 13 when the feeding of compressed air to the ejector nozzle 13 is stopped. The pressure of the compressed air that is fed to the ejector nozzle 13 is higher than the pressure of drilling dust in the dust removal pipe 5. The sampling pipe 7 comprises an ejector connector 16 for feeding compressed air to the ejector nozzle 13, and an ejector channel 17 connecting the ejector connector 16 and the ejector nozzle 13. The ejector connector 16 is connectable to a compressed-air hose. Typically the ejector channel 17 surrounds the suction pipe 10. The ejector channel 17 may be annular. The coil 11 (the portion wound around the suction pipe 10) is arranged in a longitudinal direction of the suction pipe 10 partially or entirely between the ejector connector 16 and the ejector nozzle 13. The coil 11 (the portion wound around the suction pipe 10) extends in a longitudinal direction of the suction pipe 10 over the entire portion of the ejector channel 17 surrounding the suction pipe 10. The coil 11 delimits the ejector channel 17.

The sampling pipe 7 comprises a cleaning connector 18 via which compressed air or other cleaning fluid, such as water, is feedable to the suction pipe 10 towards the suction opening 8 of the sampling pipe 7. The cleaning connector 18 is connectable to a hose feeding the cleaning fluid. The sampling pipe 7 may comprise a cleaning nozzle 19 comprising elastic material and disposed in a longitudinal direction of the sampling pipe 7 at the cleaning connector 18. The cleaning nozzle 19 is arranged to compress and open flow communication from the cleaning connector 18 to the suction pipe 10 when compressed air or other fluid is fed into the cleaning connector 18. The cleaning nozzle 19 may have flat points on the outer surface thereof at which the cleaning nozzle 19 is arranged to compress. The sampling pipe 7 may comprise a cleaning chamber 20 surrounding the cleaning nozzle 19 and being in flow communication with the cleaning connector 18. The cleaning nozzle 19 is arranged to stretch and thereby close flow communication from the cleaning connector 18 to the suction pipe 10 when the feeding of compressed air or fluid to the cleaning connector 18 is stopped. The cleaning nozzle 19 is positioned at the second end 24 of the suction pipe 10, for example against the second end 24 of the suction pipe 10. The cleaning nozzle 19 comprises a flow channel 21 through which the drilling dust flows towards the outlet opening 9 of the sampling pipe. The internal diameter of the flow channel 21 is equal to the internal diameter of the suction pipe 10.

The sampling arrangement 6 may be equipped with a control unit (not shown) which may be separate or integrated into a control system of the drilling apparatus. The control unit is arranged to control functions of the sampling arrangement 6, such as the feeding of compressed air or fluid to the ejector connector 16 and the cleaning connector 18, and the feeding of current to the coil 11.

The dust removal arrangement 1 and the sampling arrangement 6 operate as follows. A hole is drilled in the rock by the drill of the drilling apparatus. Drilling dust comprising rock material escaping from the borehole is sucked via the dust removal housing 2 into the dust removal pipe 5. From the dust removal pipe 5, the drilling dust is sucked into the sampling pipe 7 via the suction opening 8. The drilling dust flows through the suction channel 15 of the end piece, the suction pipe 10 and the flow channel 21 of the cleaning nozzle 19 to the outlet opening 9.

The drilling dust flows from the sampling pipe 7 to the separating device. The rock material is separated from the air by a separating arrangement, such as a cyclone, and collected into the collecting arrangement, for example a sample bag. The air that is discharged from the separating device is conveyed along the return pipe back to the dust removal pipe 5, for example in the flow direction of dust to a point after the suction opening 8 of the sampling pipe in the dust removal pipe 5.

Alternating current is applied to the coil 11 to create an alternating magnetic field at the suction pipe 10, for example at the end 23 of the suction pipe. The alternating magnetic field demagnetizes magnetic particles in the drilling dust sample that is sucked into the sampling pipe 7. This prevents the particles from adhering to surfaces of the sampling arrangement 6. In addition, the coil 11 oscillates under alternating current, and the oscillation is transmitted to the suction opening 8 of the sampling pipe 7, whereby the particles adhered to the suction opening 8 are released under the oscillation. In addition, heat is generated in the coil 11 which dries the moist drilling dust sucked into the sampling pipe 7, thereby reducing adhesion of the dust to surfaces of the sampling arrangement 6. The heat generated in the coil 11 also heats the air flowing in the ejector channel 17.

Compressed air is fed to the ejector nozzle 13, whereby the ejector nozzle 13 opens and compressed air flows from the ejector nozzle 13 towards the suction pipe 10. The air stream of the ejector nozzle 13 sucks drilling dust from the dust removal pipe 5 via the suction opening 8 into the sampling pipe 7. When the feeding of compressed air to the ejector nozzle 13 is stopped, the ejector nozzle 13 closes. The opening and closing of the ejector nozzle 13 is achieved by means of the end piece 14 of for example elastic material as described in more detail above.

When the sampling pipe 7 is cleaned, the feeding of compressed air to the ejector nozzle 13 is stopped, whereby the ejector nozzle 13 closes. Compressed air or other fluid, for example water, is fed from the cleaning connector 18 to the cleaning nozzle 19 and further into the suction pipe 10 towards the suction opening 8. The cleaning fluid removes blockages in the suction pipe 10 and the suction opening 8. When the feeding of cleaning fluid is stopped, the cleaning nozzle 19 closes flow communication from the cleaning connector 18 to the suction pipe 10. The feeding of compressed air to the ejector nozzle 13 is restarted, whereby the ejector nozzle 13 opens and compressed air flows from the ejector nozzle 13 to the sampling pipe 7. The drilling dust is removed from the sampling pipe 7 via the outlet opening 9.

It will be clear to those skilled in the art that the various embodiments of the invention are not limited exclusively to the examples given above but may vary within the scope of the claims set out hereinafter.

The invention claimed is:

1. A sampling pipe of a sampling arrangement for taking a sample from drilling dust flowing in a dust removal pipe of a drilling apparatus, at an end of which sampling pipe there is a suction opening which is arranged to be positioned in the dust removal pipe of the drilling apparatus to suck drilling dust into the sampling pipe, wherein the sampling pipe comprises a suction pipe into which the drilling dust of the dust removal pipe is arranged to be conveyed via the suction opening of the sampling pipe, and a coil connectable to alternating current and wound around the suction pipe.

2. The sampling pipe according to claim 1, wherein the sampling pipe comprises a flow amplifier for forming suction in the suction opening of the sampling pipe, which flow amplifier comprises an ejector nozzle for conveying compressed air into the sampling pipe.

3. The sampling pipe according to claim 1, characterized by an inverter which is connected to the coil and which is arranged to convert direct current of an electrical system of the drilling apparatus into alternating current.

4. The sampling pipe according to claim 1, wherein the sampling pipe comprises a cleaning connector via which compressed air or other cleaning fluid is feedable to the suction pipe towards the suction opening of the sampling pipe.

5. The sampling pipe according to claim 4, wherein the sampling pipe comprises a cleaning nozzle comprising elastic material and disposed in a longitudinal direction of the sampling pipe at the cleaning connector, the cleaning nozzle being arranged to compress and open flow communication from the cleaning connector to the suction pipe when compressed air or other cleaning fluid is fed into the cleaning connector, and the cleaning nozzle is arranged to close flow communication from the cleaning connector to the suction pipe when the feeding of compressed air or other cleaning fluid to the cleaning connector is stopped.

6. The sampling pipe according to claim 2, wherein the sampling pipe comprises an end piece provided with a suction channel and having the ejector nozzle, the end piece being located at the end of the sampling pipe.

7. The sampling pipe according to claim 6, wherein the internal diameter of the suction channel of the end piece is equal to the internal diameter of the suction pipe.

8. The sampling pipe according to claim 6, wherein the end piece is made of elastic material arranged to stretch and thereby open the ejector nozzle when compressed air is fed to the ejector nozzle, and to shrink and thereby close the ejector nozzle when the feeding of compressed air to the ejector nozzle ceases.

9. The sampling pipe according to claim 2, wherein the ejector nozzle is directed away from the suction opening of the sampling pipe.

10. The sampling pipe according to claim 2, wherein the ejector nozzle is annular.

11. The sampling pipe according to claim 2, wherein the ejector nozzle is arranged to open when compressed air is fed to the ejector nozzle, and to close when the feeding of compressed air to the ejector nozzle ceases.

12. The sampling pipe according to claim 2, wherein the sampling pipe comprises an ejector connector for feeding compressed air to the ejector nozzle, and an ejector channel connecting the ejector connector and the ejector nozzle, which ejector channel surrounds the suction pipe.

13. The sampling pipe according to claim 12, wherein the coil is wound in a longitudinal direction of the suction pipe partially or entirely between the ejector connector and the ejector nozzle, and the coil delimits the ejector channel.

14. A dust removal arrangement of a drilling apparatus, which comprises a dust removal housing to be fitted around a mouth opening of a borehole, a dust removal pipe connected to the dust removal housing, a suction apparatus for forming suction in the dust removal housing and the dust removal pipe, and a sampling arrangement for taking a sample from drilling dust flowing in the dust removal pipe, wherein the sampling arrangement comprises a sampling pipe according to claim 1, a suction opening of which is located in the dust removal pipe, against the flow direction of the drilling dust.

15. The dust removal arrangement of a drilling apparatus according to claim 14, wherein the suction opening of the sampling pipe is located in a longitudinal direction of the dust removal pipe at a point where a flow of drilling dust coming from the dust removal housing first impinges on the inner surface of the dust removal pipe after a joining point between the dust removal housing and the dust removal pipe.

\* \* \* \* \*